(12) United States Patent
Graffouliere (10) Patent No.: US 7,239,592 B2
(45) Date of Patent: Jul. 3, 2007

(54) METHOD FOR INDICATING A SECTOR ON A DATA MEDIUM AND DATA MEDIUM SUITED TO THIS METHOD

(75) Inventor: Philippe Graffouliere, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 634 days.

(21) Appl. No.: 10/729,192

(22) Filed: Dec. 5, 2003

(65) Prior Publication Data

US 2004/0174737 A1   Sep. 9, 2004

Related U.S. Application Data

(60) Continuation of application No. 10/726,421, filed on Dec. 3, 2003, now Pat. No. 6,961,295, and a continuation-in-part of application No. PCT/FR02/01836, filed on May 31, 2002, which is a division of application No. 09/542,681, filed on Apr. 3, 2000, now Pat. No. 6,990,058.

(51) Int. Cl.
*G11B 20/10* (2006.01)

(52) U.S. Cl. .................. 369/59.23; 369/59.25

(58) Field of Classification Search ............. None
See application file for complete search history.

(56) References Cited

U.S. PATENT DOCUMENTS

| | | | | |
|---|---|---|---|---|
| 5,003,526 A | * | 3/1991 | Bailey | 369/59.24 |
| 5,280,488 A | * | 1/1994 | Glover et al. | 714/784 |
| 5,384,671 A | | 1/1995 | Fisher | |
| 5,627,946 A | * | 5/1997 | Strang, Jr. | 360/77.08 |
| 5,715,232 A | | 2/1998 | Chikazawa et al. | |
| 5,740,310 A | * | 4/1998 | De Haan et al. | 386/95 |
| 5,745,641 A | * | 4/1998 | De Haan et al. | 386/95 |
| 5,838,653 A | * | 11/1998 | Fan et al. | 369/275.1 |
| 5,867,475 A | | 2/1999 | Moriya et al. | |
| 5,956,306 A | * | 9/1999 | Ishizawa et al. | 369/47.18 |
| 6,208,477 B1 | | 3/2001 | Cloke et al. | |
| 6,456,573 B1 | * | 9/2002 | Ueki et al. | 369/47.17 |
| 6,538,982 B1 | * | 3/2003 | Van Vlerken et al. | 369/275.4 |
| 6,853,320 B2 | * | 2/2005 | Hayami et al. | 341/143 |

FOREIGN PATENT DOCUMENTS

WO  WO 97/12363  4/1997
WO  WO 01/75872  10/2001

* cited by examiner

*Primary Examiner*—Thang V. Tran
(74) *Attorney, Agent, or Firm*—Lisa K. Jorgenson; Stephen Bongini; Fleit Kain Gibbons Gutman Bongini & Bianco P.L.

(57) ABSTRACT

For indicating on a data medium (9) a sector referenced by a binary word (16) formed of a number M of first bytes each comprising a number L of bits, the method includes steps of etching onto the data medium locally at this sector a succession of M second bytes each corresponding to a first byte, each second byte being equal to a vector of N components, each with a value of +1 or −1, such that $N=2^L-1$ and such that the scalar product of said vector with any other vector to which another second byte is equal, is at most equal to +1. The data medium (9) is, for example, an optical disk.

25 Claims, 5 Drawing Sheets

FIG. 1

| | | | | | | | | | | | | | | | | | | | |
|---|---|---|---|---|---|---|---|---|---|---|---|---|---|---|---|---|---|---|---|
| 0 | 0 | 0 | 0 | -1 | 1 | -1 | 1 | 1 | -1 | -1 | 1 | -1 | -1 | -1 | 1 | 1 | 1 | 1 |
| 0 | 0 | 0 | 1 | 1 | 1 | -1 | 1 | -1 | 1 | 1 | -1 | -1 | 1 | -1 | -1 | -1 | 1 | 1 |
| 0 | 0 | 1 | 0 | 1 | 1 | 1 | 1 | -1 | 1 | -1 | 1 | 1 | -1 | -1 | 1 | -1 | -1 | -1 |
| 0 | 0 | 1 | 1 | -1 | -1 | 1 | 1 | 1 | 1 | -1 | 1 | -1 | 1 | 1 | -1 | -1 | 1 | -1 |
| 0 | 1 | 0 | 0 | 1 | -1 | -1 | -1 | 1 | 1 | 1 | 1 | -1 | 1 | -1 | 1 | 1 | -1 | -1 |
| 0 | 1 | 0 | 1 | -1 | -1 | 1 | -1 | -1 | -1 | 1 | 1 | 1 | 1 | -1 | 1 | -1 | 1 | 1 |
| 0 | 1 | 1 | 0 | 1 | 1 | -1 | -1 | 1 | -1 | -1 | -1 | 1 | 1 | 1 | 1 | -1 | 1 | -1 |
| 0 | 1 | 1 | 1 | 1 | -1 | 1 | 1 | -1 | -1 | 1 | -1 | -1 | -1 | 1 | 1 | 1 | 1 | -1 |
| 1 | 0 | 0 | 0 | 1 | -1 | 1 | -1 | -1 | 1 | 1 | -1 | 1 | 1 | 1 | -1 | -1 | -1 | -1 |
| 1 | 0 | 0 | 1 | -1 | -1 | 1 | -1 | 1 | -1 | -1 | 1 | 1 | -1 | 1 | 1 | 1 | -1 | -1 |
| 1 | 0 | 1 | 0 | -1 | -1 | -1 | -1 | 1 | -1 | 1 | -1 | -1 | 1 | 1 | -1 | 1 | 1 | 1 |
| 1 | 0 | 1 | 1 | 1 | 1 | -1 | -1 | -1 | -1 | 1 | -1 | 1 | -1 | -1 | 1 | 1 | -1 | 1 |
| 1 | 1 | 0 | 0 | -1 | 1 | 1 | 1 | -1 | -1 | -1 | -1 | 1 | -1 | 1 | -1 | -1 | 1 | 1 |
| 1 | 1 | 0 | 1 | 1 | 1 | -1 | 1 | 1 | 1 | -1 | -1 | -1 | -1 | 1 | -1 | 1 | -1 | -1 |
| 1 | 1 | 1 | 0 | -1 | -1 | 1 | 1 | -1 | 1 | 1 | 1 | -1 | -1 | -1 | -1 | 1 | -1 | 1 |
| 1 | 1 | 1 | 1 | -1 | 1 | -1 | -1 | 1 | 1 | -1 | 1 | 1 | 1 | -1 | -1 | -1 | -1 | 1 |

METHOD FOR INDICATING A SECTOR ON A DATA MEDIUM AND DATA MEDIUM SUITED TO THIS METHOD

CROSS-REFERENCE TO RELATED APPLICATIONS

This application is a continuation of International Application No. PCT/FR02/01836, filed May 31, 2002, which is based upon and claims priority from prior French Patent Application No. 01-07446, filed Jun. 7, 2001. The entire disclosures of these prior applications are herein incorporated by reference.

Additionally, this application is a continuation-in-part of U.S. patent application Ser. No. 10/726,421, filed Dec. 3, 2003, now U.S. Pat. No. 6,961,295, which is a divisional of U.S. patent application Ser. No. 09/542,681, filed Apr. 3, 2000, now U.S. Pat. No. 6,990,058. The entire disclosures of these prior applications are herein incorporated by reference.

BACKGROUND OF THE INVENTION

The field of the invention is that of writable data media such as optical disks and especially data media on which the writing of data is distributed by sectors.

Under the invention, each sector is referenced by a binary word pre-recorded onto the data medium. Thus, to access a sector, a read or write head scans the data medium until it detects this binary word on it.

Generally, a blank optical disk is not completely blank. A recording track is prestamped onto the disk. Often, this track takes the form of a spiral groove whose depth is equal to a quarter of a wavelength of the laser ray emitted by a read head. During writing to the disk, the read head follows the groove so as to keep a writing laser beam inside, next to or alternatively inside and outside of the groove.

The groove is in the form of a spiral on a macroscopic scale and sinusoidal (referred to as wobble) on a microscopic scale. The sinusoidal form is mainly used to measure the linear speed of the disk passing under the read head so as to control this speed.

According to a first known prior art, a succession of pre-positioned pits (referred to as prepits) locally in each sector, forms the binary word that references this sector. These pits are pre-positioned inside or next to the groove so as to be able to identify an absolute position of the sector by means of the read head when it follows the groove.

The frequency at which the succession of pre-positioned pits passes under the read head makes this coding scheme particularly sensitive to high-frequency noise. This sensitivity to noise causes errors in decoding the succession of pre-positioned pits to obtain the binary word that references the sector.

Another solution consists in coding the binary word by modifying certain alternations of the groove wobble. For example, a modified alternation may represent a first binary value and, vice versa, a preserved alternation may represent a second binary value complementary to the first. The alternation modifications must be made so as not to interfere with the detection of the original alternation by the read head in its feedback control functions for following the groove and calculating the speed of travel of the disk under the head.

Writing data, such as NRZ (Non-Return to Zero) data, to the disk is normally done by modulating the power of the write head laser beam in the vicinity of the read head. When the signal resulting from alternation modifications is read while writing data to the disk, the signal read on the disk is interfered with by the writing laser beam. This is the cause of errors in decoding alternation modifications for the binary word referencing the sector on which the data to be recorded is intended to be written.

In order to write the data to the proper sector as specified, errors in decoding for obtaining the binary word referencing the sector should be overcome.

SUMMARY OF THE INVENTION

One solution could be to place an analog circuit between the read head and the decoding circuit, so as to filter out any interference caused by modulating the power of the writing laser beam. However, this solution presents problems in integration when one wishes to reduce the space requirement of the electrical circuits in an optical disk read-write unit. Logic circuits enable a high degree of integration to be obtained more easily than analog circuits.

To solve this problem, a primary subject matter of the invention is a method for indicating on a data medium a sector referenced by a binary word consisting of a number M of first bytes each comprising a number L of bits. The method is characterized in that it includes steps of etching onto the data medium local to this sector a succession of M second bytes each corresponding to a first byte, each second byte being equal to a vector of N components, each of a value of +1 or −1, such that $N=2^L-1$ and such that the scalar product of said vector with any other possible vector to which another second byte is equal, is at most equal to +1.

The two values +1 and −1, taken as the first and second binary value, have the effect of obtaining a scalar product equal to N when the vector is multiplied by itself. The decoding to obtain the binary word referencing a sector can then be achieved by means of a simple logic circuit. Each second byte detected by a read head then just has to be matched to a first byte. The reference binary word then results directly from a concatenation of the first bytes thus obtained. In the absence of any read error in the second byte, the second byte is easily recognizable since it is the one whose scalar square is equal to N, greater than 1, the scalar product with other bytes being limited to 1. If there are read errors in some bits of the second byte, the second byte remains easily recognizable since it is the one whose scalar square is the closest to N, the other scalar products being less than this. It is therefore sufficient to match the first byte to the second byte whose scalar product with the second byte detected has the largest value.

Various possibilities may be envisaged for etching the sequence of second bytes.

Advantageously, the method according to the invention is further characterized in that one of the values +1 or −1 is etched by modifying an amplitude of a groove wobble period on the data medium.

For example, the amplitude is increased to represent one of the binary values and preserved to represent the other binary value. It is thus possible to use the groove for the second bytes without altering the oscillation period. This enables the qualities of the groove to be maintained, which remains centered on the same average value for position control of the read head and which remains at the same frequency for speed control of the data medium.

The various possibilities are not limited to that previously set out. Alternatively, the method is also advantageous when it is characterized in that one of the values +1 or −1 is etched by adding on an initial wobble period of a groove on the data medium three alternations of a frequency three times greater than an initial wobble frequency of said groove.

Here again, the groove wobbles remain centered around the average values of the initial undulations. This does not affect the speed evaluation since this is mainly sensitive to a frequency three times less. If the amplitude of the added sinusoidal oscillation is equal to half the amplitude of the base sinusoidal oscillation, we observe a single zero-crossing at the center of a base period. When the resulting total amplitude is slightly modified, the whole data medium space outside of the initial groove wobble remains available for writing data to be recorded.

For a lesser quantity of sectors on the data medium, it is possible to choose the number M of first bytes, equal to 1, without going outside the scope of the invention. The number L is then equal to the number of bits in the binary word referencing each sector. By dividing the binary word into at least two first bytes each comprising a number L of bits, at most equal to half the number of bits in the binary word, the size of each second byte is reduced in a substantially quadratic ratio. A size of the succession of M second bytes, less than the number of oscillations of the groove in a sector, enables all or part of the remaining oscillations to be used to improve the recognition of each sector.

According to an additional feature of the method, a third byte, called a synchronization byte, is added at the head of the succession of M second bytes, said synchronization byte consisting of an acyclic sequence of P bits with P greater than N.

The synchronization byte offers the advantage of being able to accurately detect the start of the succession of M second bytes and consequently the start of the referenced sector, thus enabling this sector to be used to its maximum capacity. Choosing an acyclic sequence of P bits with P greater than N for the synchronization byte ensures synchronization, even with a high error rate, while reducing the risk of confusion with a second byte.

Various solutions may be conceived for associating with each first byte value a vector with N components, such that its scalar product with any other vector associated with another first byte value is at least equal to 1.

For example, it is possible to obtain a Maximum Length Binary Sequence (MLBS) by means of a generator polynomial with L binary coefficients. An MLBS consists of N bits. A vector consisting of N components each associating the value −1 with a first bit value and the value +1 with a second bit value has an interesting property. The scalar product of this vector with any other vector also formed by means of a circular permutation of the MLBS is also equal to −1. There are then N vectors whose scalar product with another vector is equal to −1, therefore less than 1. Thus N vectors can be matched to N different values of first byte of L bits. However, this only allows matching one distinct vector with $N=2^L-1$ first bytes when there are $2^L$ possible values. The number of sectors which can be referenced by the binary word is correspondingly reduced.

According to a particularly advantageous embodiment of the invention, the method is characterized in that the component values of each of $2^{L-1}$ first vectors result from a different circular permutation over the same first binary sequence with a maximum length of N values and in that the component values of each of $2^{L-1}$ other vectors are of opposite sign to the component values of a different one of the $2^{L-1}$ first vectors.

The scalar product of two different first vector values is equal to −1. The scalar product of two different second vector values is equal to −1. The scalar product of a first vector with a second vector whose components result from reversal of sign from those of the first, is equal to −N. The scalar product of a first vector with any other second vector is equal to +1. It is thus possible to match $2^L$ vectors with $2^L$ first bytes. Each of all the possible values of the binary word can then reference a sector.

Different choices are possible for the values of the numbers M, L, P. Considering a data medium configuration with a groove of 248 oscillations per sector, a particularly interesting choice consists in adopting the values M=12, L=4 and P=63.

The values of M and L enable a 48-bit binary word to be obtained, which can then reference up to $2^{32}$ sectors, taking into account 16 correction bits for a Reed-Solomon code. The value of L equal to 4 gives a value N of 15 bits for each second byte. It is then possible to etch the sequence of M second bytes over 180 groove oscillation alternations. Of the 68 remaining alternations, 63 may be used for etching the synchronization byte.

BRIEF DESCRIPTION OF THE DRAWINGS

The invention will be better understood from the following description of an exemplary embodiment, referring to the drawings in which.

DETAILED DESCRIPTION OF PREFERRED EMBODIMENTS

Figure 1:
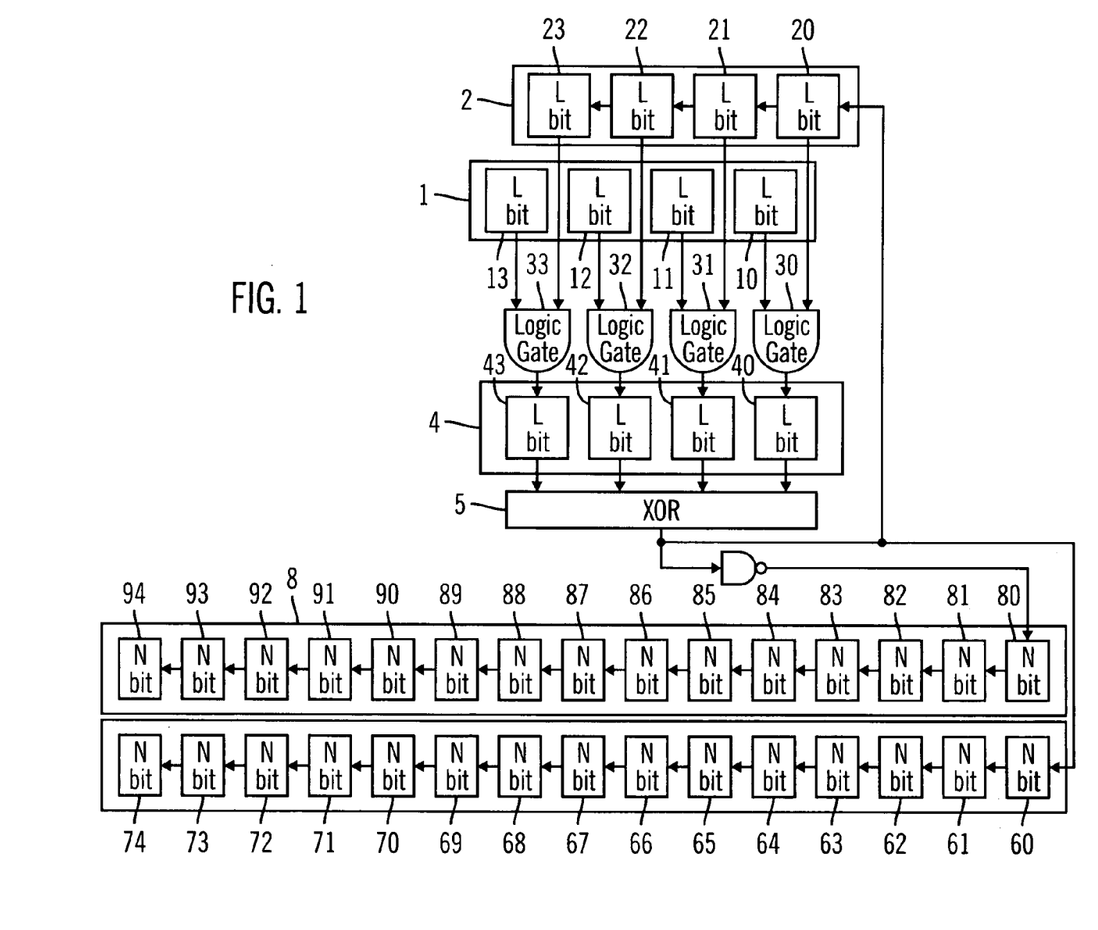
FIG. 1 represents a means for generating vectors in accordance with the invention.

Referring to FIG. 1, a means for generating a maximum length binary sequence (MLBS) is shown in the form of a circuit diagram. It is possible to translate this diagram into a program without any special difficulty. This circuit or this program is implemented prior to the method according to the invention.

A register 1 with L fixed outputs is formed of L bits 10, 11, 12, 13 each representing a coefficient of a generator polynomial of degree L−1. A shift register 2 is formed of L bits 20, 21, 22, 23. AND logic gates 30, 31, 32, 33 perform pairwise combination of the bits 10 and 20, 11 and 21, 12 and 22, 13 and 23, respectively. The output from each gate 30, 31, 32, 33 is received by a separate input of a register 4 of L bits 40, 41, 42, 43. A logic gate 5 combines the bits of register 4. Gate 5 is an XOR gate, i.e. its output is 1 if one and only one bit of register 4 is set to 1. The output of gate 5 is set to 0 in all other cases. Moreover, the output of gate 5 is fed back to the input of the shift register 2.

Thus, for example, in a first phase of a two-phase clock, register 4 performs a bitwise XOR on registers 1 and 2. In a second phase of the two-phase clock, the first bit 20 at the input of the shift register 2 receives the Exclusive OR of the bits from register 4, shifting the previous value of bit 20 to bit 21 and so on until the last bit 23 receives the previous value of bit 22.

When, in the example of FIG. 1, the number L is equal to four, bits 10, 11, 12, 13 are each respectively equal to 1, 0, 0, 1. In accordance with the results of the Galois field theory, the output from gate 5 in steady state generates a Maximum Length Binary Sequence, i.e. of a period $N=2^L-1=15$.

The output from gate 5 is also sent to the input of a shift register 6 of N bits 60, 61, 62, 63, 64, 65, 66, 67, 68, 69, 70, 71, 72, 73, 74. The complement of the output of gate 5 is sent to the input of a shift register 8 of N bits 80, 81, 82, 83, 84, 85, 86, 87, 88, 89, 90, 91, 92, 93, 94. It can be seen that the values 1, 0, 0, 1 of register 1 generate a sequence of bits 60, 61, 62, 63, 64, 65, 66, 67, 68, 69, 70, 71, 72, 73, 74, each respectively equal to 0, 1, 0, 1, 1, 0, 0, 1, 0, 0, 0, 1, 1, 1, 1, and simultaneously a sequence of bits 80, 81, 82, 83, 84, 85, 86, 87, 88, 89, 90, 91, 92, 93, 94, each respectively equal to 1, 0, 1, 0, 0, 1, 1, 0, 1, 1, 1, 0, 0, 0, 0. Each second phase of the two-phase clock causes a circular permutation of the maximum length binary sequence (MLBS) contained in registers 6 and 8.

By replacing the binary values 0 and 1 of an MLBS contained in register 6 or register 8 with the binary values −1 and +1 respectively, we obtain a vector with N components that possesses some interesting properties. The scalar product, or inner product, of two vectors obtained from two different MLBS of the same register 6 or 8 is equal to +1. The scalar square of a vector is, of course, equal to +15, the square of each component being equal to +1. The scalar product of a vector with the same vector of opposite sign is equal to −15; this is the case for two vectors obtained from an MLBS of register 6 and from a complementary MLBS of register 8. The scalar product of two vectors obtained from an MLBS of register 6 and another MLBS of register 8 is equal to −1. The periodicity of the MLBS makes it possible to obtain 2N, that is, thirty different vectors.

Figure 2:
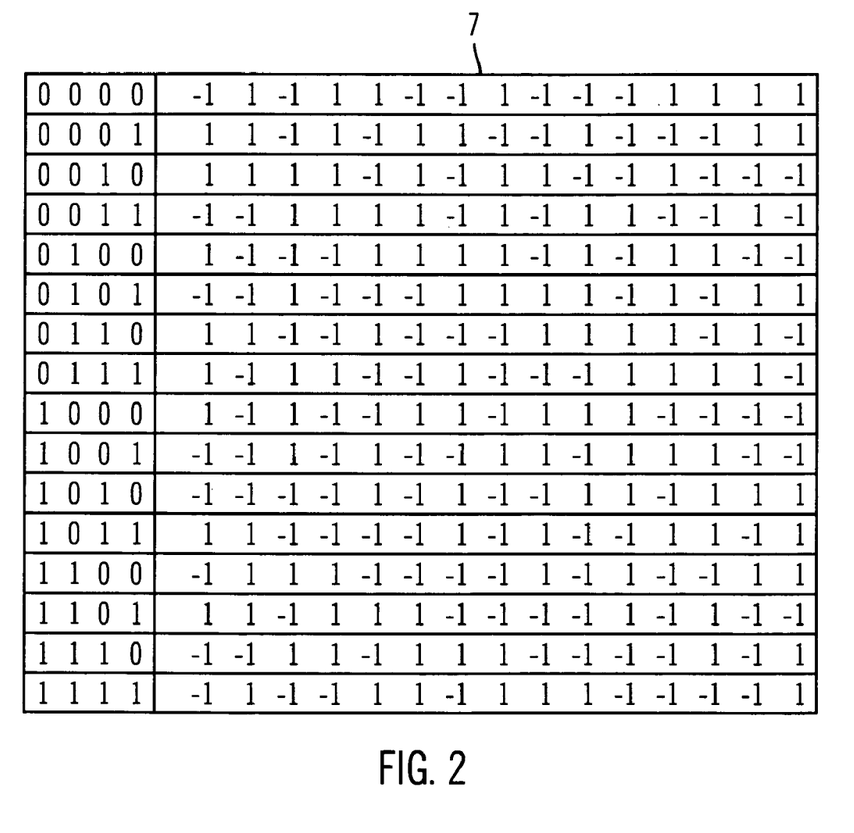
FIG. 2 shows a correspondence table in accordance with the invention.

A byte of four bits may take sixteen different values. Referring to FIG. 2, we draw up a correspondence table 7 by means of which we match a different vector to each possible value of said first byte of four bits. The correspondence table comprises N+1 rows, i.e. here sixteen rows with a first column containing a different value of the byte in each row, ranging from 0000 on the first row to the value 1111 in the last row. A second column contains a vector in each row as previously described.

In the first eight rows, the second column contains a vector resulting from an MLBS of register 6. The first row contains, for example, the vector (−1,1,−1,1,1,−1,−1,1,−1,−1,1,1,1,1,1) resulting from the MLBS (0,1,0,1,1,0,0,1,0,0,0,1,1,1,1). Each following row repeats the previous row with a double circular permutation. The last eight rows repeat the first eight rows reversing the sign of each component of the vector.

Figure 3:
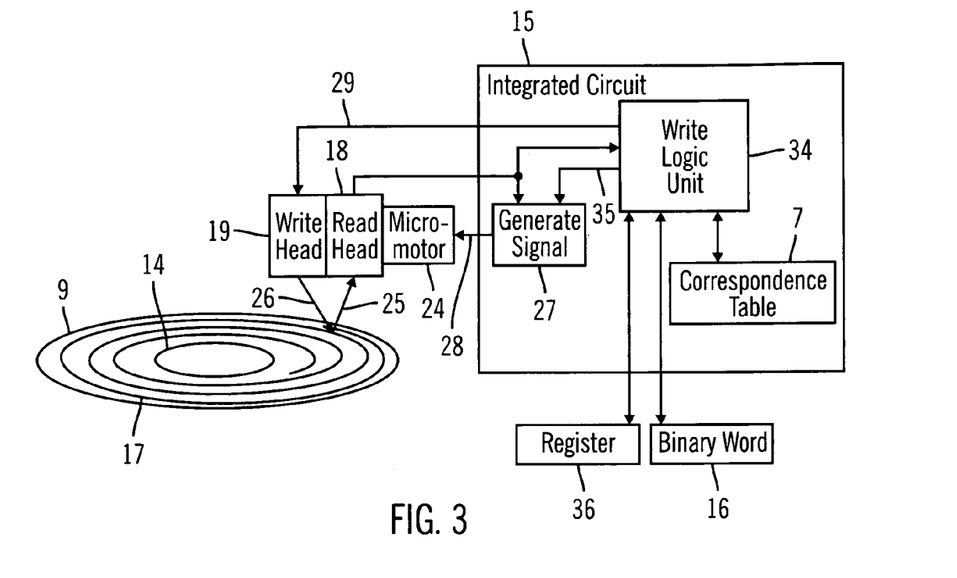
FIG. 3 shows a data medium for implementing the invention.

FIG. 3 shows a data medium on which the invention is implemented. Here, the data medium is an optical disk 9. A read head 19 is provided for emitting a laser beam 26 whose power, controlled by a signal 29, enables a groove 17 to be etched on the disk, whose depth is equal to a quarter of the wavelength of the reflected laser beam 25, receivable by a read head 18.

A micro-motor 24 is provided for moving the read head 18, write head 19 assembly along a radial direction of the disk 9. An integrated control circuit 15 controlling the read head 18, write head 19 assembly, includes a servo unit 27. The unit 27 controls the motor 24 by means of a signal 28. The signal 28 begins from a first value that positions the read head 18, write head 19 assembly close to the center 14 of the disk, up to a last value that positions the read head 18, write head 19 assembly at the periphery of the disk 9.

As the disk 9 rotates around its center 14, the signal 28 proceeds from the first to the last value so as to etch the groove onto the disk 9, which on a first scale, or macroscopic scale, has the form of a spiral from the center 14 to the periphery of the disk 9.

As the signal 28 proceeds from the first to the last value, it is modulated by an oscillation of specified initial frequency and initial amplitude, so that the groove 17 has a sinusoidal form on a second scale, or microscopic scale.

If, during the etching of the groove 17, the disk 9 rotates at a constant angular speed, the sinusoidal form of the groove is of a constant angular geometric period for the initial specified frequency.

If, during the etching of the groove 17, the disk 9 rotates at an angular speed slaved to the radial position of the read head 18, write head 19 assembly, so as to maintain a constant linear speed of travel of the disk 9 under the write head 19, the sinusoidal form of the groove is of a constant linear geometric period for the initial specified frequency.

The oscillation of the groove on a microscopic scale then enables the subsequent rotations of the disk 9 to be slaved to a speed homothetic to that of etching for the same radial position of the read head 18, write head 19 assembly.

The integrated circuit 15 includes the correspondence table 7 and a write logic unit 34. The write logic unit 34 is provided for generating a signal 35 that modulates the signal 28.

The device that has just been described is used to perform actions consisting of engraving a succession of bytes onto the disk 9 as presently explained.

A component outside the integrated circuit 15, for example a computer, generates a binary word 16 whose value references a specified sector on the disk 9. The binary word 16 is formed of a number M of first bytes each comprising L bits. In the exemplary embodiment described herein, M is taken as equal to twelve and L is taken as equal to four. The write logic unit 34 of the integrated circuit 15, receiving the value of the binary word 16, matches a vector of the correspondence table 7 to each first byte, so as to form a second byte of N bits.

For each zero bit of a byte, the logic unit 34 generates a signal 35 that reproduces an unmodified alternation, i.e. at the initial frequency and at the specified initial amplitude, so as to modulate the signal 28. For each bit of a byte set to one, the logic unit 34 generates a signal 35 that reproduces a modified alternation with respect to that at the initial frequency and at the specified initial amplitude. Various possible alternation modifications are described below.

The logic unit 34 begins by modulating the signal 28 for etching a third so-called synchronization byte in the groove, formed of an MLBS of P bits. In the exemplary embodiment described herein, P is taken as equal to sixty-three. Subsequently, the logic unit 34 modulates the signal 28 for etching each of the second bytes in the groove. Each bit of the sequence formed by the third and M second bytes is etched on a groove oscillation alternation. In the example described here, this sequence is thus etched over two hundred and forty-three basic alternations. Then, the logic unit 34 modulates the signal 28 with five unmodified alternations.

During the etching on two hundred and forty-eight groove oscillation alternations locally to a sector, the logic unit 34 receives a new value of binary word 16 for referencing the next sector. Just as before, the logic unit 34 matches M new second bytes to the M first bytes of the new value of binary word 16. Just as before, the logic unit 34 modulates the signal 28 for etching a new sequence formed of the synchronization byte followed by M new second bytes. This operation is repeated until the end of the groove 17 or the last value of the binary word 16 is reached.

In a binary word 16 of forty-eight bits where one eight-bit byte is reserved for data for example on the type of disk and two eight-bit bytes are dedicated to a Reed-Solomon type of correction on the binary word, three eight-bit bytes remain for identifying the sector. This allows sixteen million sectors to be referenced with a high reliability. With two hundred and forty-eight oscillation alternations at the initial specified frequency per sector and a possibility of writing one hundred and fifty-six bits of data per alternation next to the groove, each sector may contain in the order of 4.7 megabytes. Such a disk may contain in the order of 75 gigabytes.

Figure 4:
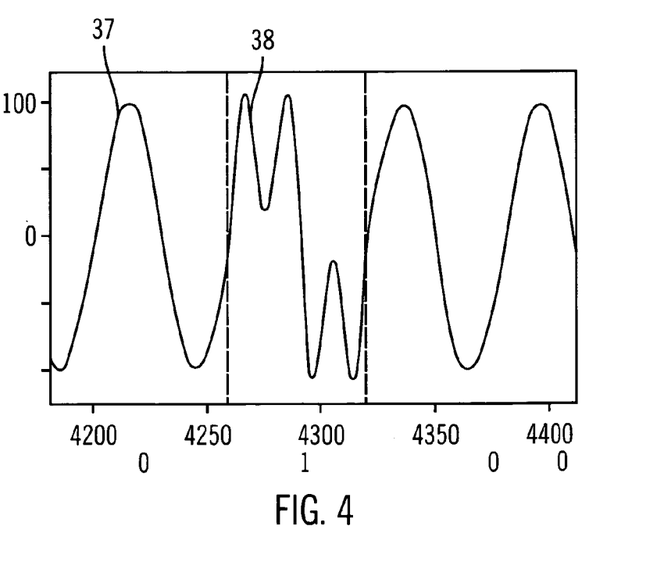
FIGS. 4 to 6 each show a local enlargement of the groove to highlight a possible alternation modification.
Figure 5:
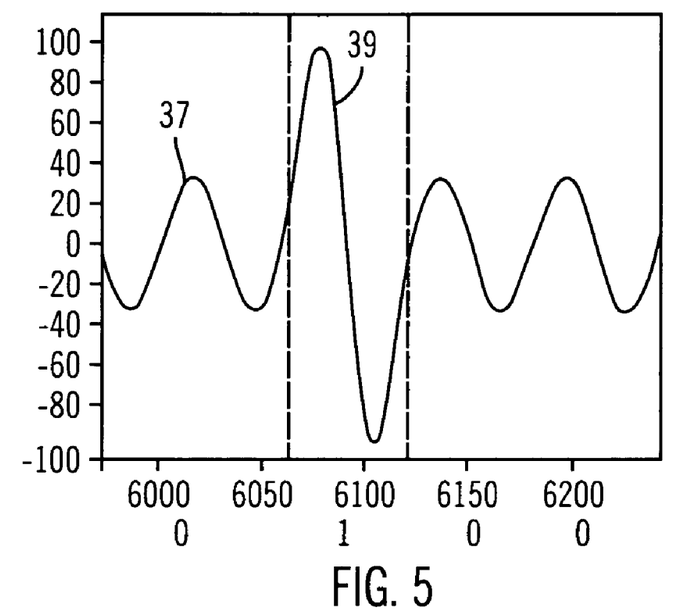
Figure 6:
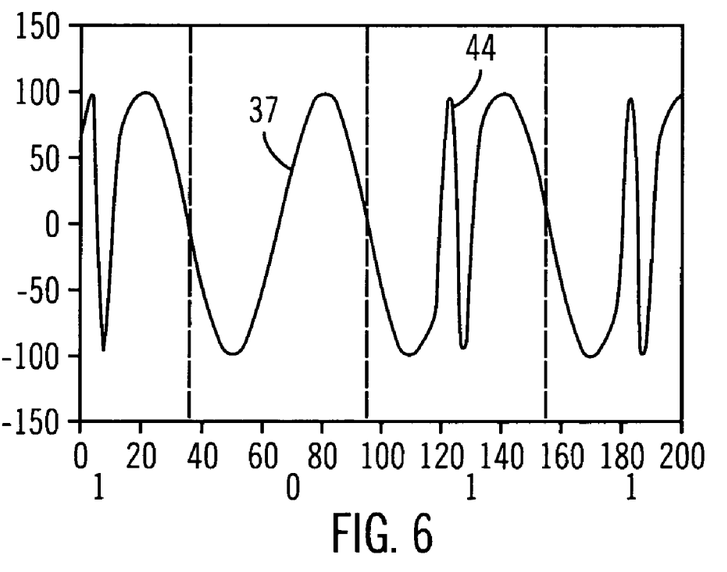

FIGS. 4 to 6 show various possible alternation modifications.

FIG. 4 shows an alternation modification superimposing a triple frequency oscillation on an initial unmodified alternation frequency. An alternation 37 remains at the initial spatial frequency in the absence of modulation of the signal 29 when a bit of the byte is set to 0. An alternation 38 is modified at a triple spatial frequency by modulation of the signal 28 when a bit of the byte is set to 1. By superimposing the triple frequency oscillation over a whole alternation period on the initial spatial frequency, the oscillation envelope at the initial frequency is preserved. At the rotation speed of the disk 9, the spatial oscillation of the groove 17 modulates the laser beam 25 over a whole period and thus enables a gain in detection power. A three-fold multiplication of the spatial frequency over an initial period multiplies the temporal frequency by just as much. It is then necessary to provide a filter in the parts of the integrated circuit 15 that process clock signals so as to reduce the bandwidth around the initial frequency. When the parts of the integrated circuit 15 that process the clock signals basically detect values on either side of zero on an alternation, it can be seen in FIG. 4 that, since the zero-crossing of a modified alternation is preserved, the detection of the clock frequency is hardly affected.

FIG. 5 shows an alternation modification by increase in amplitude. An alternation 37 remains at the initial spatial amplitude in the absence of modulation of the signal 29 when a bit of the byte is set to 0. An alternation 38 is modified at a triple amplitude by modulation of the signal 29 when a bit of the byte is set to 1. This alternation modification has the advantage of preserving the spatial frequency.

FIG. 6 shows an alternation modification superimposing a single oscillation alternation on a quintuple frequency of an initial unmodified alternation frequency. An alternation 37 remains at the initial spatial frequency in the absence of modulation of the signal 29 when one bit is set to 0. An alternation 44 is modified by superimposition at its center of an alternation at a spatial frequency five times greater, by modulation of the signal 29 when one bit is set to 1. By superimposing a single oscillation alternation on a substantially greater frequency, the shape of the alternation remains the same as the initial form over two-fifths at the start of the period and two-fifths at the end of the period of the initial form. Thus interference with the parts of the integrated circuit 34 responsible for following the initial oscillation of the groove 17 is reduced. This alternation modification has the advantage of preserving the spatial amplitude but considerably reduces the modification detection window.

These three modulations are notable for the possibility of detecting them by matched filtering. Moreover, in each case, the modulation is orthogonal to the sinusoidal modulation, which facilitates detection.

The optical disk thus provided with pre-markings for referencing its data recording sectors can act as a matrix for mass production of recordable data media.

Such a data medium, for each of its sectors referenced by a binary word formed of M first bytes each comprising L bits, includes a succession of M second bytes each comprising N bits whose values are interpretable as + or −1 values of N components of an associated vector such as the scalar product of said vector with any other vector associated with other second byte values is at most equal to +1, with $N=2^L-1$.

These M second bytes, preceded by a synchronization byte for each sector, are preferably etched on the groove by modifying alternation of the spatial micro-oscillations of the groove. As explained in the rest of the description, these pre-markings enable a recording and/or reading system to recognize a data medium sector for recording or reading computer data on it.

Figure 7:
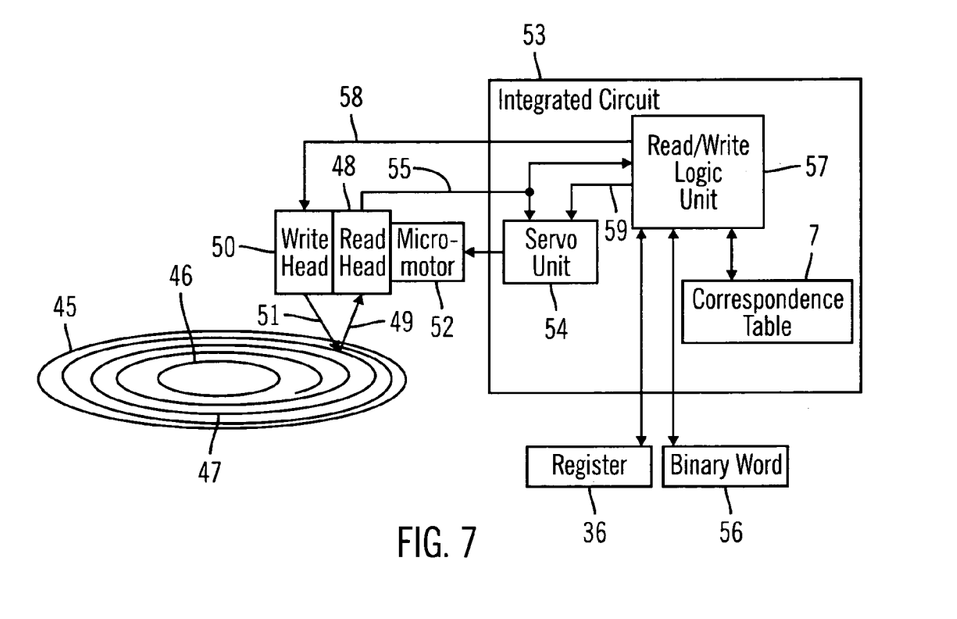
FIG. 7 and 8 show means of using the invention.
Figure 8:
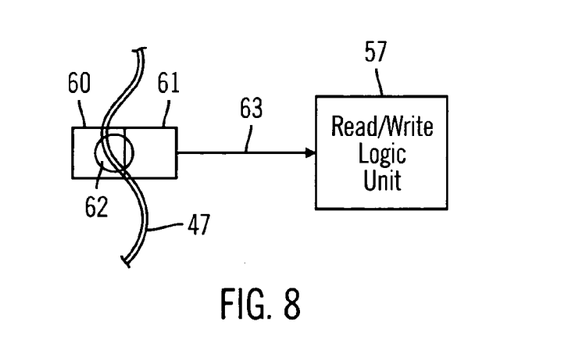

FIG. 7 shows the means of operation of such a recording medium. These means of operation include a device similar to or different from the device in FIG. 3.

Referring to FIG. 7, an optical disk 45 includes a spiral groove 47 from the center 46 to the periphery, whose depth is equal to a quarter of a wavelength of laser beam 49 receivable by a read head 48. When the disk 45 rotates around its center 46, the laser beam 49 received by the head 48 enables it to be slaved in position to follow the median line of the groove. A write head 50 mechanically linked to the read head 48 is provided for etching signals onto the disk 45, next to the groove 47, by means of a laser beam 51.

A micro-motor 52 is provided for moving the read head 48, write head 50 assembly along a radial direction of the disk 45. An integrated control circuit 53 controlling the read head 48, write head 50 assembly includes a servo unit 54. The unit 54 controls the motor 52 to maintain a constant value for a signal 55 modulated by the power received from the laser beam 49.

On a microscopic scale, the groove 17 has the form of a sinusoidal oscillation of which at least a first harmonic has a constant geometric period. The read head 48, write head 50 assembly is equipped with a pair of photodetectors 60, 61 arranged perpendicularly to the groove. The image of a spot 62 of light reflected by the groove 47 onto both detectors 60, 61 generates a signal 63 of the push-pull type via the difference in light intensities received by each of the photodetectors 60, 61. The signal 63 contains the first harmonic which, detected by the integrated circuit 53, enables a measurement to be made of the linear speed of travel of the disk under the read head 48, write head 50 assembly. Among these oscillations, certain alternations are identical to the first harmonic with a base amplitude, others include a second harmonic or are of a different amplitude; these are the modified alternations previously described. Each modified alternation causes an additional modulation of the push-pull type signal during its passage under the pair of photodetectors 60, 61.

The integrated circuit 53 includes the correspondence table 7 and a read/write logic unit 57. The read/write logic unit 57 is set up to generate a signal 58 for modulating the power of the laser beam 51 emitted by the write head 50.

The device that has just been described is used to perform actions consisting of positioning the read head 48, write head 50 assembly on the specified sector of the disk 45.

A component outside the integrated circuit 57, for example a computer, generates a binary word 56 whose value references the specified sector on the disk 45. The binary word 56 is formed of a series of M first bytes each comprising L bits. In the exemplary embodiment described herein, M is taken as equal to twelve and L is taken as equal to four.

Furthermore, the logic unit 57 receives the signal 63. The logic unit 57 interprets the signal 63 as being equal to +1 when the signal 63 results from an additional modulation of the reflected laser beam 49 caused by a distorted alternation. The logic unit 57 interprets the signal 63 as being equal to −1 in other cases. Thus, the logic unit 57 receives a succession of binary values equal to + or −1 via the signal 63.

When the logic unit 57 receives a succession of binary values that match the bits of the synchronization byte, the logic unit 57 forms the scalar product of the N binary values immediately following the last bit of the synchronization byte, with each vector of the correspondence table. The synchronization byte enables the logic unit 57 to accurately detect the first bit of the first of the second bytes of the series etched on the disk.

The logic unit 57 retains the correspondence table vector whose scalar product with the binary values received from the signal 55 has the largest value. This vector is the one that has the highest probability of matching the second byte etched on the groove at the place passing under the read head 48. In the absence of any error, this scalar product is equal to N. The logic unit 57 then sends out the first byte that corresponds to the second byte in the table 7.

In the absence of any error, we have seen previously that the scalar product of two equal vectors is equal to N, for example fifteen. The scalar product of two different vectors is less than or equal to +1, for example −15, −1 or +1. A read error on a bit reduces the scalar product of two equal vectors to N−2, for example thirteen. A read error on a bit increases the scalar product of two different vectors by two units in the worst case. In order for the scalar product of two equal vectors not to be greater than (N+1)/2, for example eight, at least (N+1)/4 non-compensated errors are required, for example four errors for N=15. In order for the scalar product of two different vectors to be greater than (N+1)/2, for example eight, at least (N+1)/4 non-compensated errors are required, for example four errors for N=15.

If the logic unit 57 detects via the signal 63 a series of second bytes that all correspond, each to a first byte of the same rank originating from the binary word 56, the logic unit 57 sends a command in the signal 59 destined for the servo unit 54, for the read head 48 to remain above the sector detected as being that referenced by the binary word 56.

The integrated circuit 53 accesses, in reading or writing, to a register 36 intended to contain computer data recorded or to be recorded on the disk 45.

To order the writing of computer data onto a specified sector of the disk 45, the component outside the integrated circuit 57, for example a computer, generates a binary word 56 whose value references the specified sector. The outside component, not shown, stores the computer data to be written to the sector in the register 36.

When the logic unit 57 has positioned the write head 50 linked to the read head 48 above the referenced sector of the disk 45, the logic unit 57 loads the data contained in the register 36 to modulate the signal 58 destined for the read head 50, so as to record the data of the register 36 onto the referenced sector of the optical disk 45.

To order the reading of computer data in a specified sector of the disk 45, the component outside the integrated circuit 57, for example a computer, generates a binary word 56 whose value references the specified sector.

When the logic unit 57 has positioned the read head 48 on the referenced sector of the disk 45, the logic unit 57 converts modulations of the signal 55 representing data recorded on the referenced sector, into bytes of computer data which it stores in the register 36. The outside component, not shown, then reads the computer data recorded on the referenced sector of the optical disk 45, in the register 36.

The integrated circuit 53 that has just been described offers good reliability for recognizing a sector referenced on the optical disk 45.

The teaching of the invention is not restricted to the example that has just been described. In particular, a person skilled in the art, basing himself on the results of the Galois field theory may conceive other systems of vectors verifying the above-mentioned properties without going outside the framework of the present invention, for example with other values of M and L or with other modifications in oscillation alternations of the guiding groove on the data medium.

The person skilled in the art will appreciate that in matching a different vector to each possible value of a first byte of L bits, the properties of the scalar product are advantageously utilized to detect a vector having the highest probability of corresponding to a first byte value.

What is claimed is:

1. A method for indicating on a data medium a sector referenced by a binary word consisting of a number M of first bytes that each include a number L of bits, said method comprising the steps of:
   providing a data medium; and
   etching onto the data medium, locally at the sector, a succession of M second bytes that each correspond to one of the M first bytes referencing the sector, each of the second bytes being equal to a vector having N components, each with a value of +1 or −1, such that $N=2^L-1$ and such that a scalar product of the vector with any other vector to which another of the second bytes is equal, is at most equal to +1.

2. The method according to claim 1, wherein one of the value of +1 and the value of −1 is etched by modifying an amplitude of a groove wobble period on the data medium.

3. The method according to claim 1, wherein one of the value of +1 and the value of −1 is etched by multiplying by three an initial wobble frequency over a whole initial alternation period.

4. The method according to claim 1, further comprising the step of etching onto the data medium a synchronization byte at the head of the succession of M second bytes, the synchronization byte consisting of a maximum length binary sequence of P bits, with P being greater than N.

5. The method according to claim 4, wherein M=12, L=4, and P=63.

6. The method according to claim 5,
   wherein the component values of each of eight first vectors result from a different circular permutation over the same first maximum length binary sequence of fifteen values, and
   the component values of each of eight other vectors are of opposite sign to the component values of a different one of the eight first vectors.

7. The method according to claim 1,
   wherein the component values of each of $2^{L-1}$ first vectors result from a different circular permutation over the same first maximum length binary sequence of N values, and
   the component values of each of $2^{L-1}$ other vectors are of opposite sign to the component values of a different one of the $2^{L-1}$ first vectors.

8. The method according to claim 1,
   wherein the data medium includes a plurality of sectors, and
   the etching step is performed for each of the sectors of the data medium.

9. A data medium comprising:
a plurality of sectors for storing computer data, each of the sectors being referenced by a binary word consisting of a number M of first bytes that each include a number L of bits; and
a succession of M second bytes etched locally at one of the sectors, each of the second bytes corresponding to one of the M first bytes referencing the sector, each of the second bytes being equal to a vector of N components, each with a value of +1 or −1, such that $N=2^L-1$ and such that a scalar product of the vector with any other vector to which another of the second bytes is equal, is at most equal to +1.

10. The data medium according to claim 9, wherein one of the value of +1 and the value of −1 is etched as a modified amplitude of a groove wobble period on the data medium.

11. The data medium according to claim 9, wherein one of the value of +1 and the value of −1 is etched as three alternations of frequency three times greater than an initial groove wobble frequency on the data medium, added onto a wobble period of the groove.

12. The data medium according to claim 9, further comprising a synchronization byte etched at the head of the succession of M second bytes, the synchronization byte consisting of a maximum length binary sequence of P bits, with P being greater than N.

13. The data medium according to claim 12, wherein M=12, L=4, and P=63.

14. The data medium according to claim 13,
wherein the component values of each of eight first vectors result from a different circular permutation over the same first maximum length binary sequence of fifteen values, and
the component values of each of eight other vectors are of opposite sign to the component values of a different one of the eight first vectors.

15. The data medium according to claim 9,
wherein the component values of each of $2^{L-1}$ first vectors result from a different circular permutation over the same first maximum length binary sequence of N values, and
the component values of each of $2^{L-1}$ other vectors are of opposite sign to the component values of the different one of $2^{L-1}$ first vectors.

16. The data medium according to claim 9, wherein a succession of M second bytes is etched locally at each of the sectors of the data medium.

17. An integrated circuit for detecting on a data medium a sector referenced by a binary word, said integrated circuit comprising:
a correspondence table that matches a succession of M first bytes forming a binary word with a succession of M second bytes, each of the first bytes having a number L of bits and each of the second bytes corresponding to one of the M first bytes, each of the second bytes being equal to a vector of N components, each with a value of +1 or −1, such that $N=2^L-1$ and such that a scalar product of the vector with any other vector to which another of the second bytes is equal, is at most equal to +1; and
a logic unit for forming the scalar product of a first vector of the correspondence table with a second vector originating from a received signal, and for detecting that the second vector matches one of the first bytes when the scalar product of the first and second vectors is substantially greater than +1.

18. The integrated circuit according to claim 17, wherein the logic unit also detects a synchronization byte from the received signal.

19. The integrated circuit according to claim 17, wherein M=12 and L=4.

20. An apparatus for indicating on a data medium a sector referenced by a binary word consisting of a number M of first bytes that each include a number L of bits, said apparatus comprising:
a write head;
a servo coupled to the write head; and
a logic unit coupled to the write head and the servo, the logic unit controlling the servo and the write head so as to etching onto the data medium, locally at the sector, a succession of M second bytes that each correspond to one of the M first bytes referencing the sector, each of the second bytes being equal to a vector having N components, each with a value of +1 or −1, such that $N=2^L-1$ and such that a scalar product of the vector with any other vector to which another of the second bytes is equal, is at most equal to +1.

21. The apparatus according to claim 20, wherein one of the value of +1 and the value of −1 is etched by modifying an amplitude of a groove wobble period on the data medium.

22. The apparatus according to claim 20, wherein one of the value of +1 and the value of −1 is etched by multiplying by three an initial wobble frequency over a whole initial alternation period.

23. The apparatus according to claim 20, wherein the logic unit controls the servo and the write head so as to also etch onto the data medium a synchronization byte at the head of the succession of M second bytes, the synchronization byte consisting of a maximum length binary sequence of P bits, with P being greater than N.

24. The apparatus according to claim 23, wherein M=12, L=4, and P=63.

25. The apparatus according to claim 20, wherein the logic unit controls the servo and write head so as to etch a succession of M second bytes locally at each of a plurality of sectors of the data medium.

* * * * *

UNITED STATES PATENT AND TRADEMARK OFFICE
CERTIFICATE OF CORRECTION

| | |
|---|---|
| PATENT NO. | : 7,239,592 B2 |
| APPLICATION NO. | : 10/729192 |
| DATED | : July 3, 2007 |
| INVENTOR(S) | : Philippe Graffouliere |

Page 1 of 1

It is certified that error appears in the above-identified patent and that said Letters Patent is hereby corrected as shown below:

Col. 11, Claim 15, line 38, change "$2^{-1}$" to -- $2^{L-1}$ --.

Signed and Sealed this

Twenty-first Day of August, 2007

JON W. DUDAS
*Director of the United States Patent and Trademark Office*